United States Patent [19]

Castelaz

[11] Patent Number: 5,276,770
[45] Date of Patent: Jan. 4, 1994

[54] TRAINING OF NEURAL NETWORK FOR MULTI-SOURCE DATA FUSION

[75] Inventor: Patrick F. Castelaz, Yorba Linda, Calif.

[73] Assignee: Hughes Aircraft Company, Los Angeles, Calif.

[21] Appl. No.: 979,394

[22] Filed: Nov. 19, 1992

Related U.S. Application Data

[63] Continuation of Ser. No. 852,926, Mar. 13, 1992, abandoned, which is a continuation of Ser. No. 740,663, Aug. 2, 1991, abandoned, which is a continuation of Ser. No. 392,683, Aug. 11, 1989, abandoned.

[51] Int. Cl.$^5$ .............................................. G06F 15/18
[52] U.S. Cl. ......................................... 395/23; 395/22
[58] Field of Search ........................ 395/23, 24, 27, 22

[56] References Cited

U.S. PATENT DOCUMENTS

| | | | |
|---|---|---|---|
| 4,254,474 | 3/1981 | Cooper et al. | 364/900 |
| 4,660,166 | 4/1987 | Hopfield . | |
| 4,858,147 | 8/1989 | Conwell | 395/27 |
| 4,914,604 | 4/1990 | Castelaz | 364/517 |
| 4,945,494 | 7/1990 | Penz et al. | 364/513 |

OTHER PUBLICATIONS

Lippmann, Richard P., "An Introduction to Computing with Neural Nets", *IEEE ASSP Magazine*, pp. 4-22, Apr. 1987.
Hecht-Nielsen, Robert, "Neurocomputing: Picking the Human Brain", *IEEE Spectrum*, Mar. 1988, pp. 36-41.
Kosko, Bart, "Constructing an Associative Memory", *Byte*, Sep. 1987, pp. 137-144.
Rumelhart, D. E., Hinton, G. E., and Williams, R. J., "Learning Internal Representations by Error Propagation", Parallel Distributed Processing Explorations in the Microstructure of Cognition, vol. 1, Chapter 8, pp. 318-362.
Kirkpatrick, S., Gelatt, Jr., C. D., Vecchi, M. P., "Optimization by Simulated Annealing", *Science*, vol. 220, pp. 671-680.

*Primary Examiner*—Allen R. MacDonald
*Attorney, Agent, or Firm*—Wanda K. Denson-Low

[57] ABSTRACT

A method of training a multilayer perceptron type neural network to provide a processor for fusion of target angle data detected by a plurality of sensors. The neural network includes a layer of input neurons at least equal in number to the number of sensors plus the maximum number of targets, at least one layer of inner neurons, and a plurality of output neurons forming an output layer. Each neuron is connected to every neuron in adjacent layers by adjustable weighted synaptic connections. The method of training comprises the steps of (a) for each sensor, designing a plurality of the input neurons for receiving any target angle data, the number of designated input neurons for each sensor being at least as large as the maximum number of targets to be detected by the sensor; (b) for a known set of targets having a known target angle for each sensor, applying a signal related to each known target angle to the designated input neurons for each of the sensors, wherein the output neurons will produce an initial output; (c) for a selected one of the sensors, designating a plurality of the output neurons to correspond to the input neurons designated for the selected sensor and applying the signal related to the known target angles for the selected sensor to the designated output neurons to provide a designated output signal wherein the difference between the initial output and the designated output signal is used to adapt the weights throughout the neural network to provide an adjusted output signal; and (d) repeating steps (a)-(c) until the adjusted output signal corresponds to a desired output signal.

3 Claims, 3 Drawing Sheets

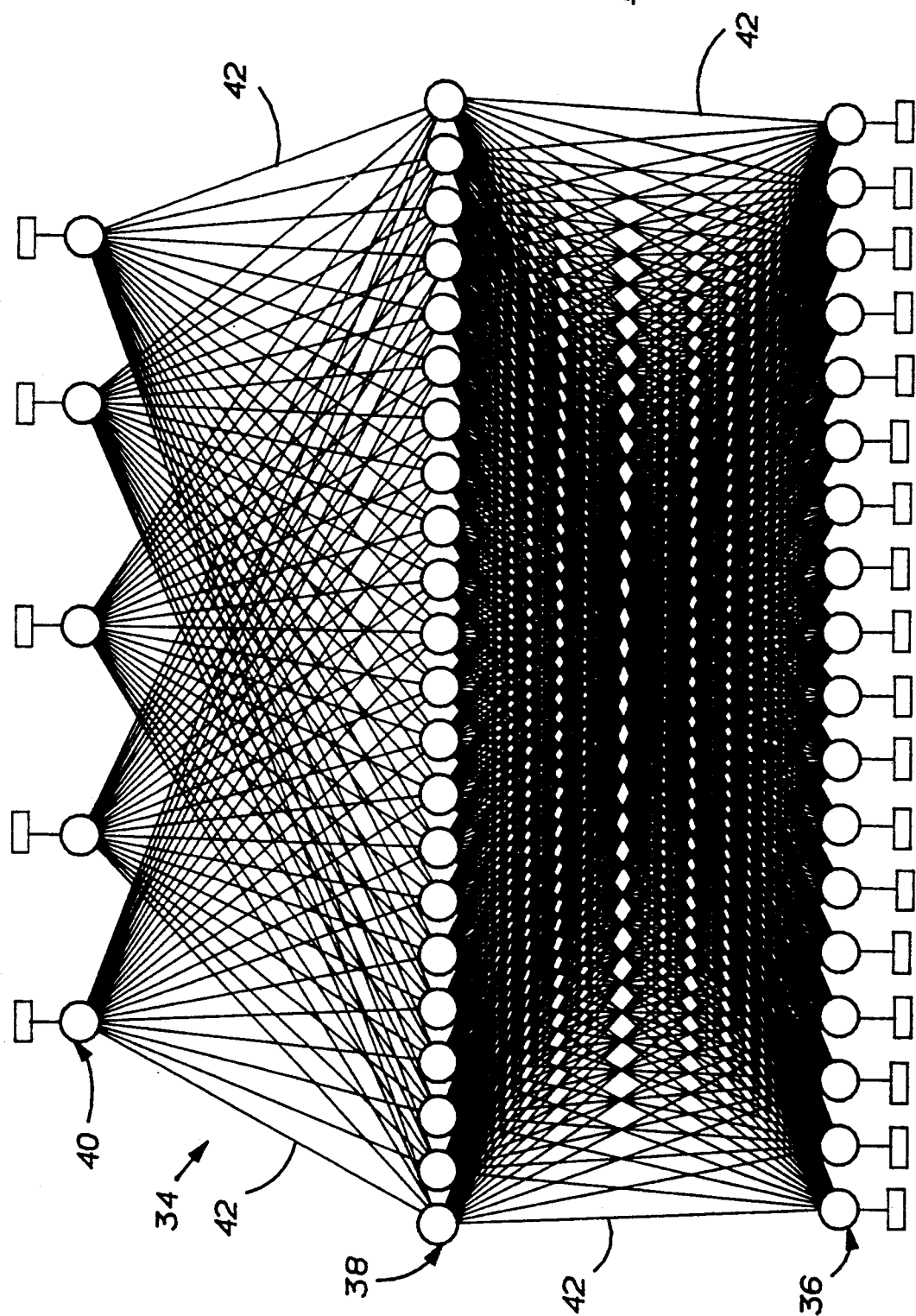

TRAINING OF NEURAL NETWORK FOR MULTI-SOURCE DATA FUSION

This is a continuation of application Ser. No. 07/852,926, filed Mar. 13, 1992, now abandoned, which is a continuation of application Ser. No. 07/740,663, now abandoned, filed Aug. 2, 1991, which is a continuation of application Ser. No. 07/392,683, filed Aug. 11, 1989, now abandoned.

BACKGROUND OF THE INVENTION

1. Technical Field

This invention relates to information processors, and more particularly, to a neural network processor for solving assignment problems.

2. Discussion

Optimization problems, such as constrained assignment problems, are among the most difficult for conventional digital computers to solve. This is because assignment problems are generally not solvable with a single solution, but instead there may be a range of possible solutions of which the best solution is sought. Often, the processing technique requires one entity to be selected from among many and assigned to one and only one other entity in such a way as to force the entire assignment over all entities to be optimal in some sense. For example, where individual "costs" are assigned to each entity-to-entity mapping, the problem becomes one of minimizing the total cost.

Examples of assignment problems include optimal plot-to-track correlation processing, the Traveling Salesman Problem, optimal resource allocation, computerized tomography, multi-beam acoustic and ultrasound tracking, nuclear particle tracking, multi-sensor data fusion (deghosting) for angle-only (passive) objects detected by multiple sensors, etc. Of particular interest is the deghosting problem. This problem arises whenever objects are to be detected from angle-only data originating from multiple sensors. For example, the sensors may be radar, infrared, optical or other types of sensors. In such cases a single sensor provides a measurement that consists of the angle (azimuth) on which a target lies on a line-of-bearing. With two or more sensors, the location can be determined as the intersection of the two lines-of-bearing. However, with multiple targets, multiple lines-of-bearing will be seen at both sensors. Lines will cross and intersections will be formed at points where no target actually exists. These intersections are called ghosts.

To illustrate the severity of the problem, if ten targets are observed by two sensors, up to 100 intersections can be formed. Since there are only 10 targets that means 90 of the intersections will be ghosts. With 50 targets, 2,500 intersections and 2,450 ghosts could be formed. Since the sensors have no other information available, no further discrimination of targets can be made.

The addition of a third sensor might help to resolve the ambiguities since one would find targets at the intersection of three lines-of-bearing, or triple intersections. However, with measurement inaccuracies, three lines-of-bearing corresponding to a true target will not intersect at a single point but will define a triangular region. The problem then is to first determine which triangular regions have small enough areas that they might be targets, and then to sort out the true targets from the ghosts in a group where there are many more intersections than targets. While targets will generally have smaller areas, merely taking the smallest areas will not ensure that no ghosts will be chosen.

Some previous approaches to assignment problems, such as the deghosting problem, have emphasized solutions in software on general purpose computers. One disadvantage with software solutions to assignment problems, is that they require extensive algorithm development, massive computational power, and are exceedingly slow for real-time or near-real-time problems such as angle-only target location problems. This is because the deghosting problem is a non-deterministic polynomial complete (NP-complete) class problem, for which the computational requirements for conventional techniques increase exponentially as a function of the number of targets. As a result, the problem involves a "combinatorial explosion", or exponential blowup in the number of possible answers. Thus, to solve the deghosting problem, conventional solutions, even using advanced state of the art array and parallel processors, have difficulty handling real-time problems of realistic sizes. For example, conventional solutions of the deghosting problem for three sensors are sufficiently fast up to about 15 targets, but become exponentially computation-bound beyond that. For numbers of targets in the range of 30 or so, typical software approaches using integer programming techniques could require virtually years of VAX-equivalent CPU time.

Others have suggested approaches for solving assignment problems utilizing neural networks. Such systems are called neural networks because of their similarity to biological networks in their highly interconnected structure and in their ability to adapt to data and exhibit self-learning. A key advantage of a neural network approach is that the network can be trained to solve the problem and an explicit algorithm does not have to be developed. For example, see U.S. Pat. No. 4,660,166, issued to J. Hopfield, where a type of neural network is used to solve the Traveling Salesman Problem. Others have suggested the use of a neural network technique known as simulated annealing. See S. Kirkpatrick, Gelatt, and Vecchi: 37 Optimization by Simulated Annealing", 220 Science, p. 671–680 (1983). However, while algorithms using this approach have been developed, to the applicant's knowledge, practical working architectures have not been implemented. Also, neural nets such as the one described in U.S. Pat. No. 4,660,166 are generally not fast enough for real-time applications of reasonable complexity. Recent results suggest severe limitations to the size of problems addressable by Hopfield nets. For example, the Traveling Salesman Problem has been found to fail for more than thirty cities. Also, even some neural network approaches use a network that embodies certain application constraints or use certain optimizing techniques. This results in greater complexity, and other limitations since the constraints must first be known and then the network configured to learn these constraints.

Thus it would be desirable to provide an information processor that reduces the computation time required to solve constrained assignment problems of realistic sizes in real-time.

It would also be desirable to provide an information processor that can solve such problems without requiring extensive algorithm development.

It would be desirable to provide an information processor to solve assignment problems which did not require explicit known constraints nor employ optimization techniques.

SUMMARY OF THE INVENTION

In accordance of the teachings of the present invention, a neural network is adapted to receive at least three sets of inputs simultaneously. The three or more sets of inputs are directed to three or more sets of input neurons respectively. The neural network is adapted to produce an output, which is a rearrangement of the inputs in one of the three or more sets. By correlating the output with one of the sets of inputs a solution to the assignment problem is given. This solution also permits the correlation of one or more additional groups of inputs. The network is trained by presenting a number of known solutions consisting of a rearrangement of one of the three or more sets, presented at the output neurons.

BRIEF DESCRIPTION OF THE DRAWINGS

FIG. 4 is a diagram of a neural network in accordance the prior art.

DESCRIPTION OF THE PREFERRED EMBODIMENT

In accordance with the teachings of the present invention, a method and apparatus is provided for solving constrained assignment problems using a neural network. Using examples of solved assignment problems, the neural network is trained to solve novel problems. The constraints of the particular problem to be solved are not articulated, but instead are deduced by the network through its training. The present invention presumes that the there exists a structure inherent to each particular problem which is not obvious to the analyst or algorithm developer. The present invention uses the ability of a trainable neural network to discern and extract this underlying structure, and subsequently use this structure, represented in its interconnections, to generalize and solve the assignment problem for arbitrary new configurations presented to the network.

Figure 1:
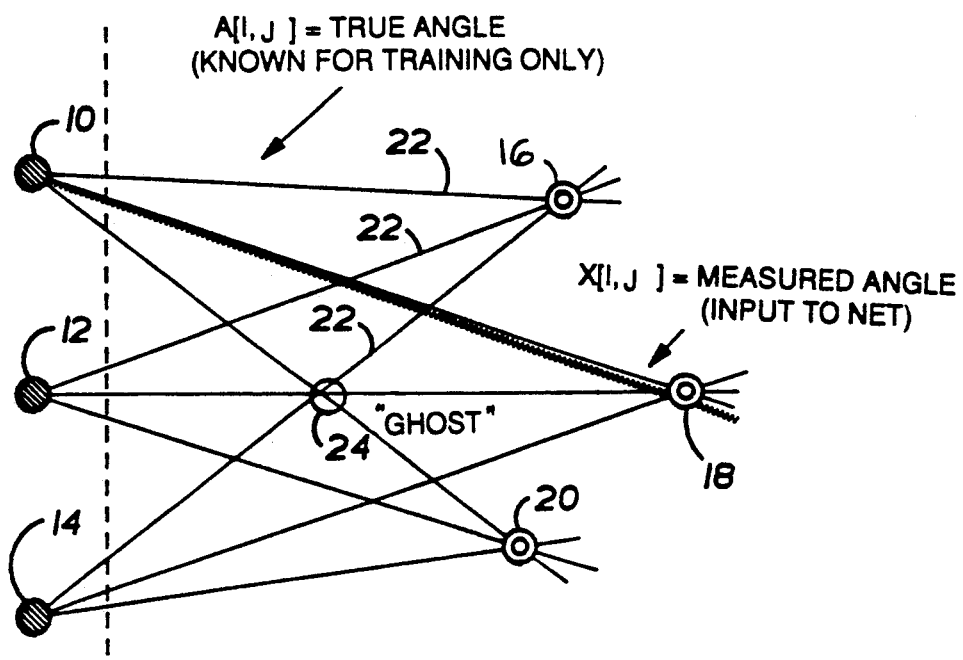
FIG. 1 diagram of a typical deghosting problem for angle-only data from three sensors.

In accordance with the preferred embodiment, the techniques of the present invention will be applied to the problem of deghosting angle-only data from sensors. It will be appreciated that the deghosting problem is presented as one example of the utilization of the techniques of the present invention but that a variety of other types of problems can be solved using the present invention. In FIG. 1 a scenario is depicted wherein angle-only data is obtained from three sensors. These sensors, 10, 12 and 14 respectively, are capable of detecting the angle at which an object lies with respect to the sensor but are not capable of giving information regarding the distance of the object. Thus it is known that a first object 16 lies at some angle with respect to a given reference point from sensor one 10. Likewise it is also known that a second object 18 and a third object 20 lie at second and third angles respectively from sensor one 10. By employing additional sensors, 12 and 14 it is desired to locate the position of the three objects 16, 18 and 20 by finding points at which scan lines 22 connecting sensors and detected objects, intersect.

In particular, it is assumed that objects 16, 18 and 20 will lie at points where a scan line 22 from each of sensors one 10, two 12 and three 14 intersect. In most cases, however, scan lines 22 will have more than one triple intersect. For example, two triple intersects occur along scan line 22 connecting sensor three 14 and object 16. The extra triple intersect 24 is called a ghost, since it is known that no object exists at that point. The deghosting problem is the process of distinguishing ghosts from true objects.

Figure 2:
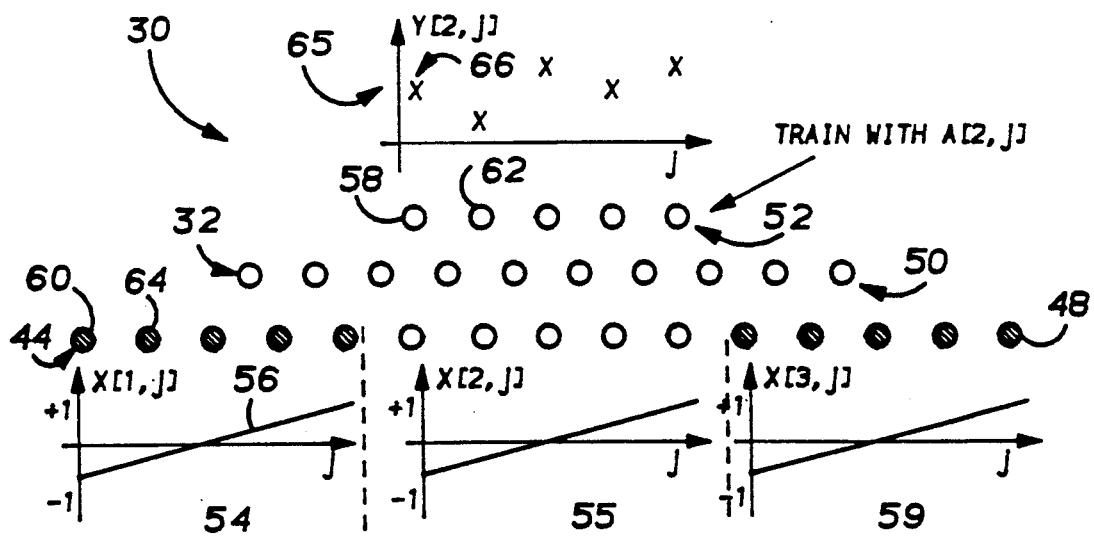
FIG. 2 is a diagram of a neural network in accordance present invention adapted to receive inputs from three sensors.

Referring now to FIG. 2, an Adaptive Processor for Multi-Source Data Fusion 30 is shown that is capable of solving the deghosting problem for three sensors depicted in FIG. 1. The adaptive processor for multi-source data fusion 30, in accordance with the present invention, comprises a plurality of individual processors, or neurons 32, arranged in a manner known generally as a neural network. In particular, the individual neurons 32 are interconnected in such a way that the interconnection strength can be altered during a training procedure.

The particular interconnections scheme and training algorithm employed may be according to any number of neural network techniques, including, but not limited to the Multilayer Perceptron, the Boltzman machine, counterpropagation, Hopfield Net, Hamming Net, etc. While it is preferable that the neural network architecture and training algorithm employed belong to the class of supervised, as opposed to unsupervised, nets, unsupervised nets may also be applicable.

By way of a nonlimiting example, the adaptive processor 30 in accordance with the preferred embodiment, utilizes a neural network known as the Multilayer Perceptron, as shown in FIG. 4. The functioning of the multilayer perceptron 34 as well as its associated learning algorithm, known as backward error propagation, are described in detail in Rumelhart, Hinton, and Williams, "Learning Internal Representations By Error Propagation", in D. E. Rumelhart and J. L. McClelland (EDS.), Parallel Distributed Processing; Explorations in the Microstructure of Cognition. Vol. Foundations, M.I.T. Press (1986), which is incorporated herein by reference.

In general, the multilayer perceptron 34 comprises an arrangement of processing units or neurons of three types, input neurons 36, inner neurons 38 and output neurons 40. Each of the neurons 36, 38 and 40 comprise similar processors which are capable of receiving an input and generating an output that is some function, for example, a sigmoid logistic nonlinearity, of the input. In addition, each neuron 36, 38 and 40 is connected to every neuron in the adjacent layer by means of synaptic connections 42. The synaptic connections 42 are weighted connections and are capable of increasing or decreasing the connection strength between individual neurons 36, 38 and 40. During a training procedure in accordance with the backward error propagation technique, a training input is presented to the input neurons 36 and an output is produced at the output neurons 40. A desired output is then presented to the output neurons 40 and the difference between the desired and the actual output is found. An error signal based on this difference is used by the neurons 36, 38 and 40, to change the weighted synaptic connections 42 in such a way so as to reduce the amount of the error. This error signal is then propagated to the next layer of neurons, for example, the inner layer 38. After repeated training sessions, the desired output will be produced in response to the training input. Once trained, the neural network 34 can be used to produce the desired output even where the input contains only incomplete or altered forms of the training input.

Referring now to FIG. 2, the adaptive processor 30 is shown incorporating a neural network 30, which may comprise a multilayer perceptron such as the one shown in FIG. 4 having certain modifications as will be discussed below. In the adaptive processor 30, the input neurons are divided into three groups. The first group of neurons 44 correspond to inputs from the sensor one 10. The second group of neurons 46 accept inputs from sensor two 12. The third group of neurons 48 accept inputs from sensor three 14. It should be noted that, accordingly, the number of neurons in each group 40, 46 and 48 is the same as the number of input angles from the three sensors 10, 12 and 14 respectively. The inner neurons 50 in the adaptive processor 30 may comprise any number of neurons, and may comprise multiple inner layers. It should be noted while the synaptic connections 42 such as those shown in FIG. 4 are not shown in FIG. 2 for simplicity of illustration. However, as is the case in a conventional multilayer perceptron, each neuron in each layer of the adaptive processor 30 is connected to every neuron in every adjacent layer.

The adaptive processor 30 also includes a layer of output neurons 52 which will be used to produce an output that corresponds to the sensor inputs from sensor two 12. Thus, the number of output neurons 52 should match the number of input neurons in the second group 46, in accordance with the preferred embodiment. It should be noted that while in the preferred embodiment of the adaptive processor 30 the output neurons 52 are correlated with the sensor two neurons 46, a different group of input sensors could be chosen to correlate with the output neurons, in accordance with the present invention.

FIG. 2 also includes a series of graphs depicting the sensor angles from each sensor. In particular, the sensor one graph 54 is a graph of the sensor one angles arranged in increasing order. The ramped line 56 is derived by simply connecting the points at which the angles are plotted on the graph 54. Line 56 is shown as a straight line for simplicity, but, it will be appreciated that it may be of any arbitrary shape depending on the arrangement of angles. It will also be noted that the angles from sensor one 10 are defined as X [1,j], which indicates a measured angle from sensor one 10 to the $j^{th}$ object detected by sensor 1. Likewise, X[2,j] identifies the $j^{th}$ angle detected by sensor two. It will be appreciated that the five angles and five input neurons 44 in group one indicates that sensor one has detected five objects. Likewise, sensors two 12 and sensor three 14 have also detected five objects, and the angles are depicted in graphs 55 and 59 respectively. The adaptive processor 30 can be used to process a larger or smaller number of sensor angles, as well as to process more than three sensors, the only limit is the number of input neurons which are employed. In the graph for sensor one 54 the vertical axis has a range of −1 to +1. While sensor angles may have any arbitrary range, they have been normalized, using a conventional normalizing technique, to relative values lying between −1 and +1. This limits the range of values which the input neurons 44 must accept. Likewise sensor two 12 and sensor three 14 angles have also been normalized.

To begin training the adoptive processor 30, all of the sensor angles are presented to the input neurons 44, 46 and 48. While the sensor angles in FIG. 2 have been arranged in order from smallest to largest angle creating the ramped curve 56, the sensor angles could be in any arbitrary order. The input neurons 44, 46 and 48 perform some transfer function on the inputs and transmit signals to the inner neurons 50. Through interconnections such as the synaptic connections 42 shown on FIG. 4. Likewise, the inner neurons 50 perform a transfer function on the inputs received from the input layer and transmit a signal to the output neurons 52 through a synaptic connection 42. The output neurons 52 back propagation training algorithm, the input neurons 44, 46, 48 are presented with a training input consisting of angles from the three sensors for known detected objects. The output neurons 52 are presented with a training input A[2,j]. A[2,j] comprises normalized angles from sensor two 12 which are rearranged. That is, the training input A[2,j] contains the same angles as the training input from sensor two that is presented to the input neurons 46, except that, the angles have been rearranged into an order which matches the order of the sensor one angles. It is recalled that the sensor one input angles are arranged in increasing order from the smallest to the largest angle. Thus, the first angle in A[2,j]58 represents the angle at which a particular object is detected from sensor two. The first sensor one angle which was presented to input neuron 60 represents the angle at which the same object was detected from sensor one 10. In similar fashion, the second angle 62 in A[2,j] also represents the angle at which a second object was detected by sensor two 12. The second sensor one angle presented to the second input neuron 64 represents the angle at which the second object was detected by sensor one. The remaining angles in A[2,j] likewise correspond to the next consecutive angles in sensor one 10.

The adaptive processor 30 is trained with this particular rearrangement of the sensor two angles A[2,j], because such an output would permit the identification of the true targets and the elimination of ghosts. That is, by correlating the corresponding angle from just two of the sensors the deghosting problem is solved, as will be appreciated by those skilled in the art.

In accordance with the preferred embodiment, the adaptive processor 30 utilizes the backward error propagation technique to train the network. In particular the output neurons 52 will find the difference between the desired output A[2,j]and the actual output of each neuron 52. This difference will be used to adapt the weights between the output neurons 52 and the next layer of neurons 50. Likewise, this error signal is used to adapt weights through the network up to the last layer of synaptic connections reaching the input neurons 44, 46 and 48. This training procedure is repeated by again presenting the same inputs from the three sensors and again training the network with the desired output A[2,j]. The training procedure is repeated until the actual output eventually falls within a desired range of the desired output A[2,j].

Once trained, the adaptive processor 30 will produce an output y[2,j] shown in graph 65 in response to a new set of input angles, x[1,j], x[2,j], x[3,j], for which it is not known which angles in a given sensor correlate with which angles from another sensor. The actual output of the trained adaptive processor 30 y[2,j], like the desired output used to train the net A[2,j], consists of a rearrangement of the sensor two 12 angles, such that the first angle 66 in the output y[2,j] represents the point at which an object is detected by sensor two, with that same object being detected by sensor one at the angle presented to input neuron 60. In this way, all the angles from two of the sensors are correlated so that the location of objects can be determined. The continuous-valued outputs of the output neuron may either be used exactly to correlate with sensor 1 angles, or may be best-matched to the actual sensor 2 angles, which would then be used for correlating with sensor 1.

In addition, the adaptive processor 30 may be trained further with new scenarios. That is, new sets of angles for the same number and location of sensors can again be presented to the input neurons 44, 46, 48 and the adaptive processor 30 can be trained with a new set of desired outputs A[2,j]for a different set of detected known objects. The number of different scenarios that the adaptive processor 30 is trained with will depend on a number of factors such as the nature of the problem, the number of sensors and targets, the desired accuracy, etc. In any event, once all of the training is complete, all of the information has been made available to the adaptive processor 30 and the adaptive processor, through its interconnections, will embody an algorithm that can generalize to a new case that it wasn't trained with. It is presumed that there exists a structure inherent to the problem for a given sensor arrangement which is now embodied in the adaptive processor 30. Thus, the adaptive processor can now recognize true targets and thereby eliminate ghosts.

It will be appreciated that, while FIG. 2 depicts the adaptive processor 30 being trained to yield a set of angles that are correlated with sensor one 10, it could just as easily be trained to yield a set of angles that are correlated with sensor three 14 or other additional sensors as may be employed.

Once trained the adaptive processor 30 can now be presented with a new set of sensor angles from the three sensors 10, 12 and 14. As during the training procedure the sensor angles must be arranged in the same order such as from the smallest to the largest or any other order which was used during training. The output of the adaptive processor 30 will comprise a set of sensor two 12 angles y[2,j], which are correlated with the sensor one 10 angles. That is, the first output angle can be matched with the first sensor one angle, the second output angle can be matched with the second sensor one angle and so on. This matching or correlation will yield intersecting points which correspond to actual locations of objects, and the assignment problem is thereby solved. As mentioned previously, the continuous-valued outputs of the output neuron may either be used exactly to correlate with sensor 1 angles, or may be best-matched to the actual sensor 2 angles, which would then be used for correlating with sensor 1.

Figure 3:
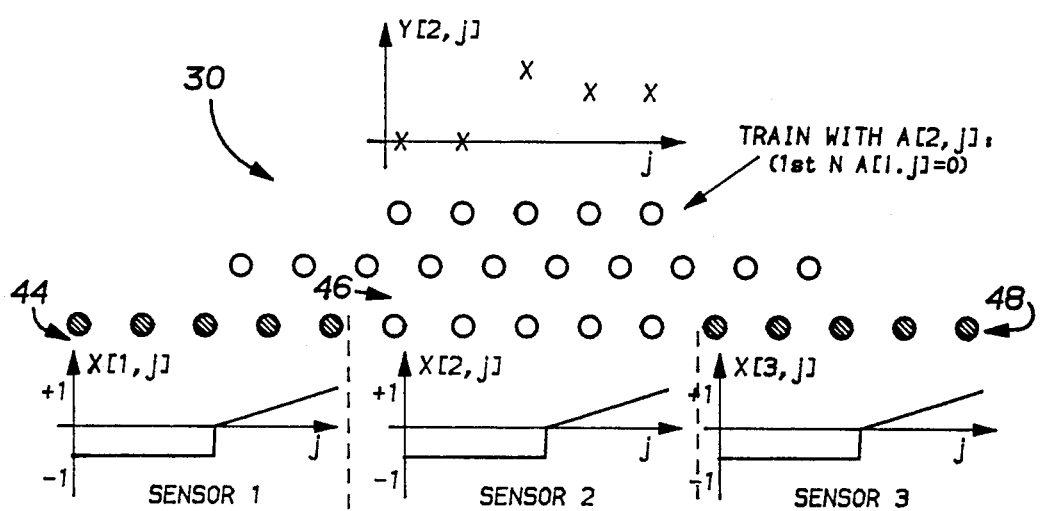
FIG. 3 is a diagram of a neural net adapted to receive inputs from three sensors where the number of targets is less than the number of inputs.

In the above example, the number of input neurons in each of the three groups 44, 46 and 48 matched the number of angles and detected objects for each sensor. FIG. 3 shows the case where the number of input neurons 44, 46, 49 respectively is larger than the number of input angles from the three sensors. By using the techniques shown in FIG. 3 the adaptive processor 30 can be used to solve problems having different numbers of objects and sensor angles. As shown in FIG. 3, the adaptive processor 30, having five input neurons for each sensor, can be used to solve a problem where there are only three angles for each sensor. To accomplish this, the first two inputs are set to −1, and the remaining angles are normalized to be between zero and 1.

Likewise, the training input A[2,j] has the first two angles set to −1. The adaptive processor is then trained as described in connection with FIG. 2. In this way, the same adaptive processor for Multi-Source Data Fusion 30 can be used for a variety of problems where the number of angles from each sensor is equal to or less than the number of input neurons in each input group 44, 46 and 48.

Once a given adaptive processor 30 is trained to solve a particular class of problems, the values of the weights in the synaptic connections 42 may then be transferred to additional processors with the weights set to these fixed values. In this way, an unlimited number of trained processors can be reproduced without repeating the training procedure.

In view of the foregoing, those skilled in the art should appreciate that the present invention provides an adaptive processor for multi-source data fusion that can be used in a a wide variety of applications, including, but not limited to the class of constrained assignment problems. The various advantages should become apparent to those skilled in the art after having the benefit of studying the specification, drawings and following claims.

What is claimed is:

1. A method of training a neural network of the multi-layer perceptron type to provide neural network processor for fusion of target angle data from targets, said targets being detected by a plurality of sensors which provide target angle data for each detected target, said neural network including a plurality of input neurons forming a first layer, the number of input neurons being at least equal to the number of sensors plus the maximum number of targets to be detected by the sensors, at least one layer of inner neurons, and a plurality of output neurons forming an output layer, each neuron being connected to every neuron in the adjacent layer of neurons by weighted synaptic connections which are capable of increasing or decreasing the connection strength between individual neurons, said method of training comprising the steps of;

(a) for each sensor, designating a plurality of the input neurons for receiving any target angle data from said sensor, the number of said designated input neurons for each sensor being at least as large as the maximum number of said targets to be detected by said sensor;

(b) for a known set of targets, each target having a known target angle for each sensor, applying a signal related to each said known target angle to the designated input neurons for each of said sensors, wherein the output neurons will produce an initial output;

(c) for a selected one of said sensors, designating a plurality of said output neurons to correspond to the input neurons designated for said selected sensor and applying said signal related to said known target angles for the selected sensor to the designated output neurons to provide a designated output signal wherein the difference between the initial output and the designated output signal is used to adapt the weights throughout the neural network to provide an adjusted output signal; and (d) repeating steps (a)-(c) until the adjusted output signal corresponds to a desired output signal.

2. A method of training a neural network as recited in claim 1 further comprising the steps of:

(a) repeating steps (a)–(c) for at least one additional set of known targets

3. A method of training a neural network as recited in claim 1 wherein step (b) comprises:
for a known set of targets, each target having known target angle for each sensor, applying a normalized signal related to each said known target angle to the designated input neurons for the appropriate one of said sensors, wherein the output neurons will produce an initial output.

* * * * *